United States Patent [19]

Hybler

[11] 4,370,211

[45] Jan. 25, 1983

[54] METHOD AND APPARATUS FOR CATHODIC PROTECTION

[75] Inventor: Ludmila Hybler, Hemel Hempstead, England

[73] Assignee: Phillips Petroleum Company, Bartlesville, Okla.

[21] Appl. No.: 190,003

[22] Filed: Sep. 23, 1980

[51] Int. Cl.³ ............... C23F 13/00; C25B 11/02; C25B 11/04
[52] U.S. Cl. .................... 204/148; 204/197; 204/289; 204/290 R; 204/292
[58] Field of Search ................. 204/196–197, 204/147–148, 289, 290 R, 292

[56] References Cited

U.S. PATENT DOCUMENTS

| | | | |
|---|---|---|---|
| Re. 27,529 | 12/1972 | Doremus et al. | 204/197 X |
| 2,067,839 | 1/1937 | Godfrey | 204/197 X |
| 3,047,478 | 7/1962 | Marsh et al. | 204/148 |
| 3,470,077 | 9/1969 | Higgins | 204/197 X |
| 3,553,094 | 1/1971 | Scott et al. | 204/197 |
| 4,051,007 | 9/1977 | Hössle | 204/148 X |
| 4,190,512 | 2/1980 | Wyatt et al. | 204/197 X |

Primary Examiner—Donald R. Valentine

[57] ABSTRACT

Apparatus comprises an anode made of a sacrificial anode metal and at least one member made of a material other than the material of the sacrificial anode metal. A method for determining the state of corrosion of an anode is also provided.

36 Claims, 12 Drawing Figures

METHOD AND APPARATUS FOR CATHODIC PROTECTION

BACKGROUND OF THE INVENTION

This invention relates to an apparatus and method for cathodically protecting a metal structure against corrosion using a cathodic protection system. In another aspect this invention relates to a method and apparatus for directly indicating the functional condition of a cathodic protection system. In still another aspect this invention relates to indicators which operatively function with a cathodic protection system so as to denote the exact point at which the system needs replacing.

Cathodic protection systems are employed to prevent corrosion of metal structures exposed to an electrolytic environment. Cathodic protection can be effected for marine or subterranean corrodible structures by electrically connecting the corrodible structure to sacrificial anodes constructed of a metal that is higher in the electromotive series than the protected structure, i.e. a metal that is anodic to the material of the protected structure. When the protected structure and the electrically connected sacrificial anode are both disposed within the same electrolytic environment (e.g., earth or water containing free positive ions), a galvanic cell is formed in which the protected structure is the cathode.

Metal atoms on the exposed surface of the sacrificial anode are ionized by the surrounding electrolyte and go into solution with the electrolyte, thereby corroding the sacrificial anode. Due to the difference in electrical potential between the cathodically protected metal and the sacrificial anode, electrons produced by the electrochemical corrosion reaction of the anode flow as an electrical current through the electrical connection between the sacrificial anode and the protected structure. When electrons reach the protected structure, they combine with positive ions in the electrolyte at the surface of the protected structure. The protected structure does not corrode since the positive ions associate with the free electrons readily available at the surface of the protected structure, which positive ions would otherwise initiate a corrosion reaction at the surface of the protected structure.

Often, the function of a cathodic protection system is supplemented by applying a protective coating to the exterior of the cathodically protected structures to reduce the exposure of the protected structure to the electrolytic environment. However, a protective coating to the exterior of the cathodically protected structures will not completely isolate the protected structure from the electrolyte since small cracks or discontinuities in the coating develop as the coating ages, allowing the portion of the structure exposed through the cracks to be corroded. Further, such a coating is incapable of perfectly isolating the corrodible structure from positive ions in the surrounding electrolyte as some of the positive ions are capable of diffusion or migration through the protective coating itself.

Cathodic protection systems are capable of protecting the corrodible structure from corrosion so long as a sufficient amount of sacrificial anode metal remains to supply electrons to the protected structure. When an anode is nearly completely corroded, it must be replaced in order for the cathodic protection system to continue its function. The corrosion rate of the sacrificial anode, and thus the point in time when the anode needs to be replaced, is difficult to predict since it is influenced by a number of variable factors such as for example the composition of the surrounding soil or water and localized variations in that composition.

Although the prior art has devised a number of schemes for determining the condition of a cathodic protection system to ascertain whether the system is functioning and/or for determining when the sacrificial anodes are in need of replacement, these schemes cannot be effectively interchanged to operate in both a subterranean as well as a marine environment. For example, in order to cathodically protect a considerable length of subterranean pipe it is necessary to have a plurality of anodes electrically connected to the pipe and spaced along the length of the pipe. The condition of a subterranean cathodic protection system is conventionally monitored by determining the polarity and/or magnitude of the electrical potential of the sacrificial anode and/or the electrical potential of the protected pipe with respect to a reference half-cell disposed in the electrolyte surrounding the pipe. These determinations must be made at a plurality of locations along the length of the pipe to determine the condition of the entire system. To facilitate these monitoring test, electrical connections, in the form of an insulated electrical conductor electrically connected to the sacrificial anode and/or the cathodically protected structure and routed to the surface of the electrolyte in which the system is disposed, are provided at various points along the pipe, e.g. at each connection between a sacrificial anode and the cathodically protected pipe. Because of the expense and physical impracticality of stabilizing such monitoring schemes on water surfaces, such prior art monitoring systems, such as the one described above, may be satisfactory for subterranean cathodic systems however, the conventional way to monitor marine systems continues to be the physical inspection thereof by underwater divers.

In spite of its acceptance and wide use, underwater inspection has inherent shortcomings which influence and affect the data obtained. Visability of the driver appears to be the most critical of a number of factors which influence the validity of the data obtained in underwater inspection. For example, in shallow waters and near the ocean floor, which is where most cathodic protection systems are located, sediments are often suspended in a layer of murky water, a diver's vision may be significantly reduced, even with the aid of additional lighting. Because the visual conditions at the inspection site are oftentimes hampered by unstable water conditions, the use by the diver of conventional equipment requiring visual interpretation, an example of such is a portential meter, is most unreliable since near ideal conditions must be present for an effective use thereof. These inescapable water conditions pose a continuous problem inasmuch as adequate cathodic protection of offshore pipe lines is dependent on obtaining reliable data on which to base decisions for replacing dysfunctional systems.

It is therefore an object of this invention to provide an apparatus and a method for cathodically protecting a metal structure against corrosion which is submerged in an electrolyte. Another object of this invention is to provide a method and apparatus for indicating when a cathodic protection system is dysfunctional. Still another object of this invention is to provide a method and apparatus for indicating the exact point at which a cathodic protection system needs replacing.

STATEMENT OF THE INVENTION

In accordance with the present invention apparatus comprises an anode made of a sacrificial anode metal, said anode being in the shape of an arc having a first surface terminating at a first radius and a second surface terminating at a second radius wherein said second radius is larger than said first radius, at least one member, said member being made of a material other than the material of said sacrificial anode metal and wherein at least one said member is at least partially encased by said sacrificial anode matal and generally extends outwardly from said first surface of said sacrificial anode metal.

Further according to the invention a method comprising oxidizing in a corrosive zone an anode comprising a sacrificial anode metal, the anode being in the shape of an arc having a first radius terminating at a first surface and a second radius terminating at a second surface wherein the second radius of the second surface changes due to oxidation, said second radius being larger than said first radius, at least one member being made of a material different than the sacrificial anode metal, and wherein at least one member is at least partially encased by the sacrificial anode metal and generally extends outwardly from said first surface, and indicating the state of corrosion of the anode in the corrosive zone by the change in the length of the at least one member extending above the second surface of the sacrificial anode metal.

DETAILED DESCRIPTION OF THE INVENTION

Figure 1:
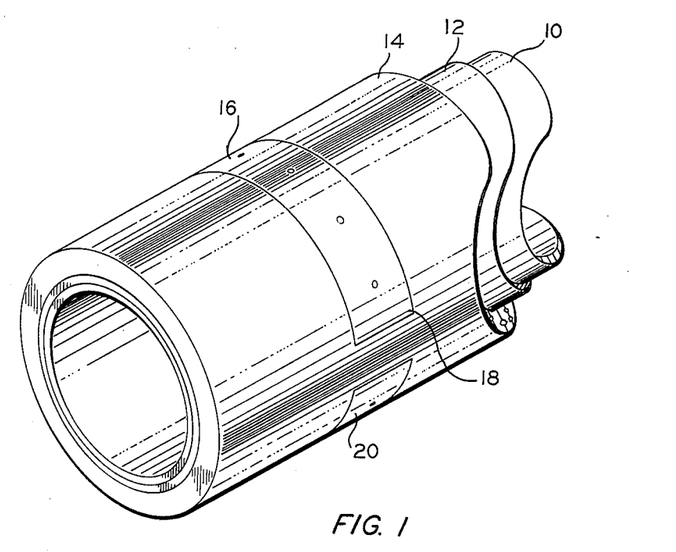
FIG. 1 is a pictorial view of a portion of an underwater pipeline according to one embodiment of the invention.

Referring now to FIG. 1, the apparatus of the invention will be more fully explained. A pipeline 10, made from a material such as steel, is coated by a bituminous coating 12 and weighted with concrete coating 14 to prevent floating in a marine environment. Spaced apart and electrically connected to pipeline 10 is a bracelet type sacrificial anode assembly 16, comprised of a first section 18 and a second section 20.

Figure 3:
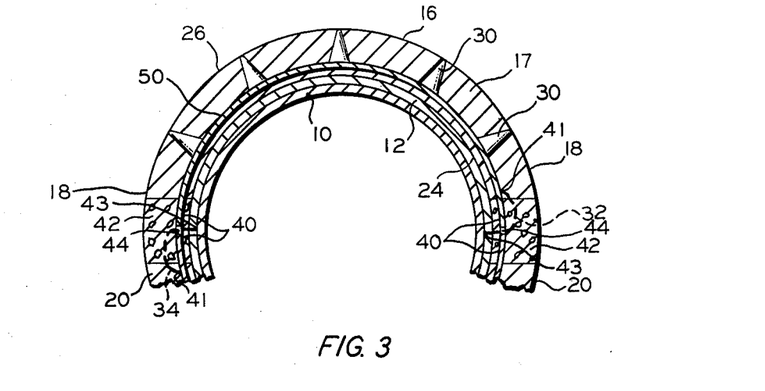
FIG. 3 is a partial cross-sectional view of the sacrificial anode of FIG. 1 along the line 3—3 of FIG. 5.

Referring now to FIG. 3, both sections 18 and 20 of the sacrificial anode assembly 16 are connected by weld joint 44 so as to surround pipeline 10 and the space therebetween is filled with concrete grout 42 so as to be flush with concrete coating 14. Sections 18 and 20 are essentially identical and while the invention will be described with reference to section 18, it is understood that section 20 comprises the same component parts as section 18. Anode 18 is made from a suitable metal 17 or an alloy such as those chosen from the electromotive series, so that in the given electrolyte the metal of the anode is spontaneously anodic to the metal of the protected structure. Because of its high activity, low cost and ready availability, aluminum is the preferred sacrificial anode metal 17. Each of the anode sections 18 and 20 is in the shape of an arc having a first radius terminating at a first surface 24, a second radius terminating at a second surface 26, wherein said second radius is greater than said first radius, a metal core 40 having a surface 50 terminating at a third radius, said third radius being larger than the first radius of said sacrificial anode metal 17 and smaller than the second radius of said sacrificial anode metal 17, an electrical connection 32 being used to connect the sacrificial anode metal 17 of section 18 to pipeline 10 by extending from connection point 41 on metal core 40 to connection point 43 on pipeline 10 and an electrical connection 34 being used to connect the sacrificial anode metal 17 of section 20 to pipeline 10 by extending from connection point 41 on metal core 40 to connection point 43 on pipeline 10, and a plurality of corrosion indicating members 30 being made of a material other than the material of said sacrificial anode metal 17 and wherein said members 30 are at least partially encased by said sacrificial anode metal 17 and generally extend radially outward.

According to the present invention members 30 can be made of a non-corrosive material selected from plastic, rubber and ceramic. While most any ceramic material is suitable generally it is selected from clay, tile and porcelain. Members 30 can also be made of steel or an alloy or selected from elemental metals such as for example iron, tin, lead, and copper. Steel is the preferred material for members 30, due to the ease of construction and such members are usually in the shape of steel spikes.

Figure 6:
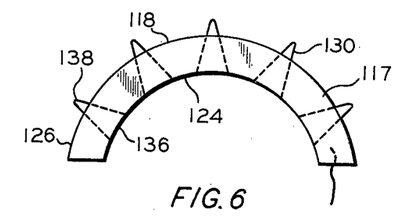
FIG. 6 is a cross-sectional view of another embodiment of the present invention.

FIG. 6 represents an embodiment of the present invention wherein anode section 118 is in the shape of an arc having a first radius terminating at a first surface 124 of said sacrificial anode metal 117. A plurality of members 130 radially project from said first surface 124 with each member 130 having a first end 136 and a second end 138. First end 136 of each said member 130 is embedded in said sacrificial anode metal 117 and second end 138 of each said member 130 radially projects from said first surface 124 of said sacrificial anode metal 117 a distance greater than the distance between said first surface 124 and said second surface 126 of said sacrificial anode metal 117.

Figure 7:
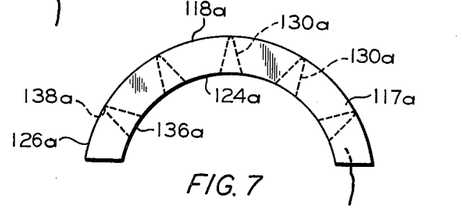
FIG. 7 is a cross-sectional view of still another embodiment of the present invention.

FIG. 7 represents another alternate embodiment of the present invention wherein anode section 118a is in the shape of an arc having a first radius terminating at a first surface 124a of said sacrificial anode metal 117a. A plurality of members 130a radially projecting from said first surface 124a with each said member 130a having a first end 136a and a second end 138a and wherein said first end 136a of each said member 130a is embedded in said sacrificial anode metal 117 and wherein said second end 138a of each said member 130a radially projects from said first surface 124a of said sacrificial anode metal 117a a distance substantially equal to the distance between said first surface 124a and said second surface 126a of said sacrificial anode metal 117a.

Figure 8:
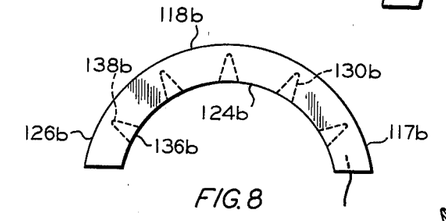
FIG. 8 is a cross-sectional view of still another embodiment of the present invention.

FIG. 8 represents still another alternate embodiment of the present invention wherein anode section 118b is in the shape of an arc having a first radius terminating at a first surface 124b of said sacrificial anode metal 117b. A plurality of members 130b radially projecting from said first surface 124b with each said member 130b having a first end 136b and a second end 138b. First end 136b of each said member 130b is embedded in said sacrificial anode metal 117b and second end 138b of each said member 130b radially projects from said first surface 124b of said sacrificial anode metal 117b a distance less than the distance between said first surface 124b of said sacrificial anode metal 117b and said second surface 126b of said sacrificial anode metal 117b.

Figure 9:
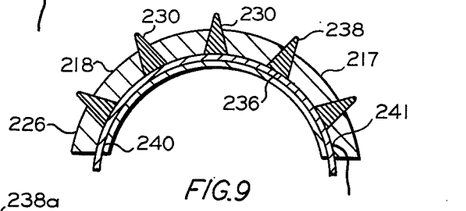
FIG. 9 is a cross-sectional view of still another embodiment of the present invention.

FIG. 9 represents an alternate preferred embodiment of the present invention wherein anode section 218 is in the shape of an arc having a first radius terminating at a first surface 224 of said sacrificial anode metal 217. A plurality of members 230 having a first end 236 and a second end 238. First end 236 of each said member 230 is attached to a metal core 240. Metal core 240 is substantially encased by said sacrificial anode metal 217, said metal core 240 having a surface 241 terminating at a third radius, said third radius of said metal core 240 being larger than said first radius of said sacrificial anode metal 217 but smaller than said second radius of said sacrificial anode metal 217. Second end 238 of each said member 230 radially projects from said surface 241 of said metal core 240 a distance beyond said second surface 226 of said sacrificial anode metal 217.

Figure 10:
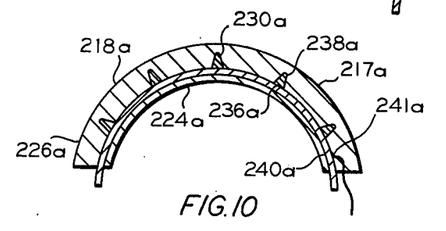
FIG. 10 is a cross-sectional view of still another embodiment of the present invention.

FIG. 10 represents an alternate preferred embodiment of the present invention wherein anode 218a is in the shape of an arc having a first radius terminating at a first surface 224a of said sacrificial anode metal 217a. A plurality of members 230a having a first end 236a and a second end 238a. First end 236a of each said member 230a is attached to a metal core 240a. Metal core 240a is substantially encased by said sacrificial anode metal 217a, said metal core 240a having a surface 241a terminating at a third radius, said third radius of said metal core 240a being larger than said first radius of said sacrificial anode metal 217a but smaller than said second radius of said sacrificial anode metal 217a. Second end 238a of each said member 230a radially projects from said surface 241a of said metal core 240a a distance less than said second surface 226a of said sacrificial anode metal 217a.

Figure 11:
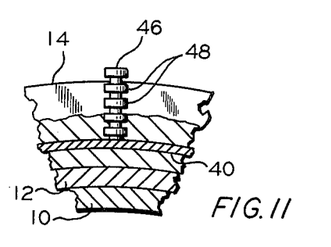
FIG. 11 is still another embodiment of the present invention wherein the members are rods having equally spaced ridges thereon.

FIG. 11 represents an alternate embodiment of the present invention wherein each corrosion indicating member 46 has equally spaced ridges 48. Further in another variation of this embodiment each ridge 48 can be represented by a color such as for example those selected from red, orange, yellow, green, blue, indigo and violet and other colors which are highly visible under reduced light conditions. Ridge 48 of member 46 can also comprise a material exhibiting fluorescence.

Figure 12:
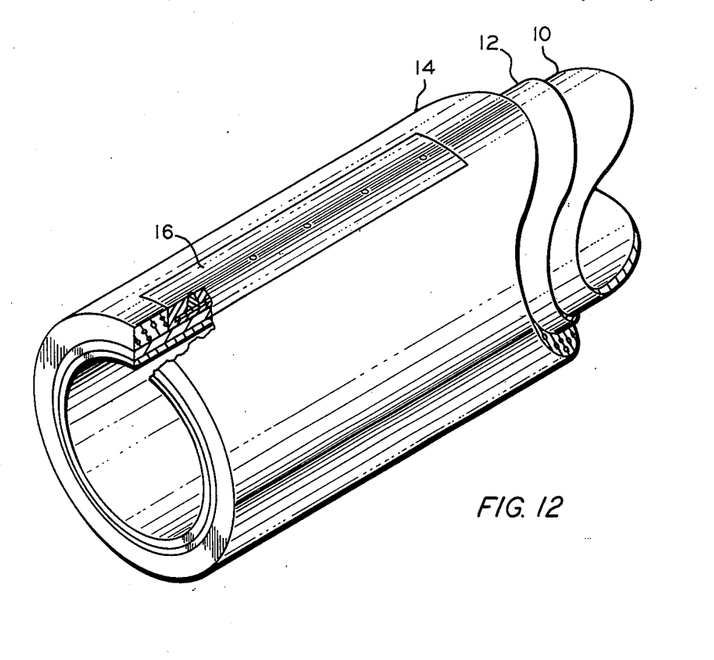
FIG. 12 is a pictorial view of a portion of an underwater pipeline as it appears before corrosion illustrating another embodiment of the instant invention.

FIG. 12 represents an alternate embodiment of the present invention that is identical to that disclosed by FIG. 1 except that the anode 16 is bar shaped.

Figure 2:
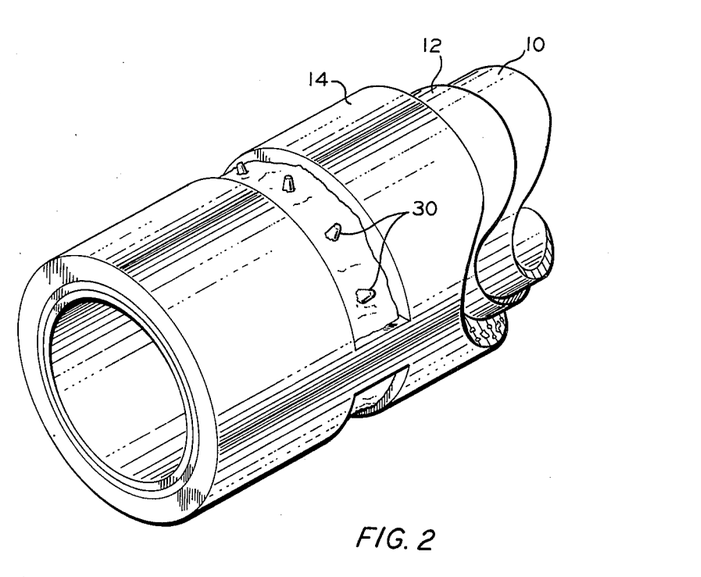
FIG. 2 is a pictorial view of the same portion of underwater pipeline of FIG. 1 as it may exist after a period of service.
Figure 4:
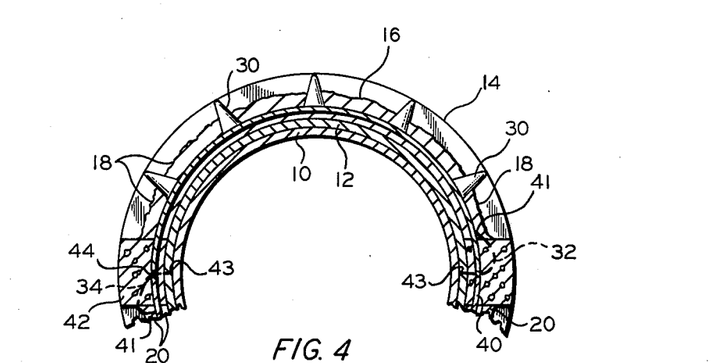
FIG. 4 is a partial cross-sectional view of the sacrificial anode of FIG. 2 illustrating the difference in the sacrificial anode after corrosion has taken place.
Figure 5:
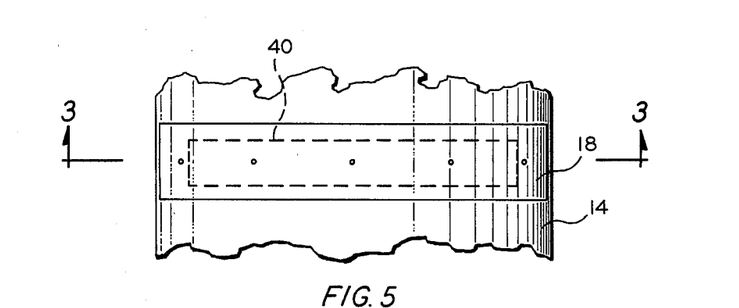
FIG. 5 is a plan view of the sacrificial anode of FIG. 1.

In another aspect of the invention each member such as member 30 shown in FIGS. 2 through 4 can be colored as indicated above. Each member can also comprise a material exhibiting fluorescence.

According to the present invention FIGS. 2 and 4 depict anodes employed in practicing this invention as they would exist in an electrolytic environment after sufficient time has lapsed to allow the sacrificial anode metal 17 to disintegrate due to corrosion. After the sacrificial anode metal 17 has disintegrated, each member 30 remains substantially intact and radially projects from the corroded surface of the sacrificial anode metal 17. In an underwater cathodic protection system, a diver can visually observe the length of each member 30 extending above the sacrificial anode metal 17 or physically measure the length of said member 30 extending above the sacrificial anode metal 17 using conventional equipment. In another embodiment of the present invention as depicted in FIG. 11, a diver can measure the length of member 46 simply by visual observation, but in addition this embodiment is particularly applicable in murky water conditions where visual observation is significantly impaired or impossible. The embodiment of FIG. 11 allows one to designate a predetermined number of ridges 48 as representative of the state of corrosion of the sacrificial anode metal 17. An underwater driver, even with a total loss of vision due to adverse water conditions at the test site, can feel the radially projecting member 46 having equally spaced ridges 48 thereon and count the number of ridges 48 to determine the condition of the anode metal 17.

By employing the cathodic protection system of the present invention, the driver increases the probability of generating reliable data on which to base a decision for replacing the cathodic protection system inasmuch as the validity of the data is no longer dependent on a diver finding ideal water conditions at a test site. Additionally, the cathodic protection system of this invention precludes the necessity for the diver to carry and use testing equipment such as for example a volt meter or a potential meter.

Although my invention has been described as being useful in a marine environment, it is also useful in determining the necessity for replacing anodes in a subterranean environment.

I claim:

1. A sacrificial anode for protection of a metal surface in a corrosive environment comprising:
   a solid body of a sacrificial anode metal having a first surface and an opposing second surface, and
   a plurality of means for visual or tactile determination of the extend of corrosion of the anode metal, said means comprising radial projections of a relatively noncorrosive material, the projections being spikes which are at least partially encased within the sacrifical anode metal so as to be increasingly exposed as the second surface of the sacrificial anode is corroded.

2. The sacrifical anode of claim 1 in which, prior to corrosion of the anode material, the radial projections are essentially coterminous with the second surface.

3. The sacrificial anode of claim 1 in which, prior to corrosion of the anode material, the radial projections terminate between the first surface and the second surface.

4. The sacrificial anode of claim 1 in which, prior to corrosion of the anode material, the radial projections extend beyond the second surface.

5. The sacrificial anode of claim 1 further comprising a metal core encased by the sacrificial anode material and serving as a base for the radial projections.

6. The sacrificial anode of claim 1 in which the radial projections are generally conical in shape and project toward the second surface with decreasing diameter.

7. The sacrificial anode of claim 6 further comprising a metal core encased by the sacrificial anode material to which the radial projections are attached at their conical bases.

8. The sacrificial anode of claim 6 in which the conical projections are steel.

9. The sacrificial anode of claim 8 in which the sacrificial anode metal is aluminum.

10. The sacrificial anode of claim 6 in which the conical projections are made from a non-corrosive material selected from plastic, rubber and ceramic.

11. An article of manufacture comprising the sacrificial anode of claim 1 or claim 6, a metal object, and means for electrical connection between the anode metal of the sacrificial anode and the metal object.

12. The article of manufacture of claim 11 in which the radial projections of the sacrificial anode are not in physical contact with the metal object.

13. The sacrificial anode of claim 1 in which the radial projections comprise a material exhibiting fluorescence.

14. The sacrificial anode of claim 1 in which the radial projections are of a color selected from red, orange, yellow, green, blue, indigo and violet.

15. The sacrificial anode of claim 1 in which the solid body is a cylindrical segment.

16. The sacrificial anode of claim 1 in which the solid body is a bar.

17. A sacrificial anode for protection of a metal surface in a corrosive environment, comprising:
 a solid body of a sacrificial anode metal having a first surface and an opposing second surface, and
 at least one radial projection of a relatively noncorrosive material, the projection having equally-spaced ridges and being at least partially encased in the sacrificial anode metal so as to be increasingly exposed as the second surface of the sacrificial anode metal is corroded.

18. The sacrificial anode of claim 12 in which the ridges are of at least two different colors.

19. The sacrificial anode of claim 17 in which the ridges comprise a material exhibiting fluorescence.

20. The sacrificial anode of claim 17 in which the ridges are colored from the group consisting of red, orange, yellow, green, blue, indigo and violet.

21. The sacrificial anode of claim 17 in which the anodic metal and the protected metal are selected from the electromotive series of metals.

22. An article of manufacture comprising a metal pipe electrically connected to the sacrificial anode of claim 1, 6 or 17.

23. The article of manufacture of claim 22 which further comprises a bituminous coating on the exterior surface of the pipe.

24. The article of manufacture of claim 23 which further comprises a concrete coating on the pipe.

25. A method comprising:
 oxidizing in a corrosive environment a sacrificial anode comprising a solid body of a sacrificial anode metal having a first surface and an opposing second surface, the second surface being in contact with the corrosive environment, and further comprising a plurality of means for visual or tactile determination of the extent of corrosion of the anode metal, said means comprising radial projections of a relatively non-corrosive material, the radial projections being at least partially encased in the anode material so as to be increasingly exposed as the second surface of the sacrificial anode is corroded, and
 determining the extent of corrosion of the anode metal by visual or tactile inspection of the portion of the radial projections extending outward from the second surface.

26. The method of claim 25 in which the radial projections have equally-spaced ridges and determination of the extent of corrosion of the anode metal involves visual or tactile determination of the number of ridges extending above the second surface.

27. The method of claim 26 in which the radial projections are at least one color selected from red, orange, yellow, green, blue, indigo and violet and determination of the extent of corrosion of the anode metal involves visual inspection of the ridges extending above the second surface.

28. The method of claim 25 in which the radial projections are conical in shape and determination of the extent of corrosion of the anode metal involves visual or tactile inspection of the portion of the cone extending above the second surface.

29. The method of claim 28 in which the ridges comprise a material exhibiting fluorescence.

30. A sacrificial anode for protection of a metal surface in a corrosive environment comprising:
 a solid body of a sacrificial anode metal having a first surface and an opposing second surface, and
 a plurality of means for visual or tactile determination of the extent of corrosion of the anode metal, said means comprising radial projections of a relatively noncorrosive material, the projections being at least partially encased within the sacrificial anode metal so as to be increasingly exposed as the second surface of the sacrificial anode is corroded, wherein the radial projections are generally conical in shape and project toward the second surface with decreasing diameter.

31. The sacrificial anode of claim 30 further comprising a metal core encased by the sacrificial anode material to which the radial projections are attached at their conical bases.

32. The sacrificial anode of claim 30 in which the conical projections are steel.

33. The sacrificial anode of claim 30 in which the conical projections are made from a non-corrosive material selected from plastic, rubber and ceramic.

34. The sacrificial anode of claim 30 in which the sacrificial anode metal is aluminum.

35. A sacrificial anode for protection of a metal surface in a corrosive environment comprising:
 a solid body of a sacrificial anode metal having a first surface and an opposing second surface, and
 a plurality of means for visual or tactile determination of the extent of corrosion of the anode metal, said means comprising radial projections of a relatively noncorrosive material and having a color selected from red, orange, yellow, green, blue, indigo and violet, the projections being at least partially encased within the sacrificial anode metal so as to be increasingly exposed as the second surface of the sacrificial anode is corroded.

36. A sacrificial anode for protection of a metal surface in a corrosive environment comprising:
   a solid body of a sacrificial anode metal having a first surface and an opposing second surface, and
   a plurality of means for visual or tactile determination of the extent of corrosion of the anode metal, said means comprising radial projections of a relatively noncorrosive material and comprising a material exhibiting fluoresence, the projections being at least partially encased within the sacrificial anode metal so as to be increasingly exposed as the second surface of the sacrificial anode is corroded.

* * * * *

UNITED STATES PATENT AND TRADEMARK OFFICE
CERTIFICATE OF CORRECTION

PATENT NO. : 4,370,211

DATED : January 25, 1983

INVENTOR(S) : Ludmila Hybler

It is certified that error appears in the above-identified patent and that said Letters Patent is hereby corrected as shown below:

Column 6, line 52, the word "extend" should be --- extent ---.

Column 7, line 45, in claim 18, claim 12 should be claim 17.

Signed and Sealed this

Eighth Day of November 1983

[SEAL]

Attest:

GERALD J. MOSSINGHOFF

Attesting Officer

Commissioner of Patents and Trademarks